United States Patent [19]

Just

[11] Patent Number: 5,411,213
[45] Date of Patent: May 2, 1995

[54] METHOD FOR TREATMENT OF SOLID MATERIALS

[76] Inventor: Arden L. Just, 4486 Sunnybrook Rd., Kent, Ohio 44240

[21] Appl. No.: 57,048

[22] Filed: Apr. 29, 1993

Related U.S. Application Data

[63] Continuation-in-part of Ser. No. 581,297, Sep. 12, 1990, abandoned, and Ser. No. 833,342, Oct. 2, 1992, abandoned.

[51] Int. Cl.$^6$ ............................................. B02C 4/02
[52] U.S. Cl. ........................................ 241/16; 241/21; 241/22
[58] Field of Search ............. 241/16, 22, 97, DIG. 31, 241/DIG. 38, 21, 41, 43, 62; 264/142, 380

[56] References Cited

U.S. PATENT DOCUMENTS

| | | | |
|---|---|---|---|
| 2,136,099 | 11/1938 | Buxbaum | 241/DIG. 31 X |
| 4,015,782 | 4/1977 | Granite | 241/DIG. 31 X |
| 4,625,922 | 12/1986 | Brubaker et al. | 241/DIG. 31 X |

*Primary Examiner*—Frances Han
*Attorney, Agent, or Firm*—Oldham, Oldham & Wilson Co.

[57] ABSTRACT

A process for comminuting a commercial and/or municipal waste material, having an anti-agglomeration or partitioning agent thereon, by subjecting the material to a compressive shear force. The process can be applied successively until a desired particle size distribution is achieved. This process reduces tendency of solids as being milled to agglomerate together to form larger particles and eventually sheets by charging said solids to the mill with sufficient partitioning agent present to suppress agglomeration to increase the efficiency of the process.

17 Claims, 1 Drawing Sheet

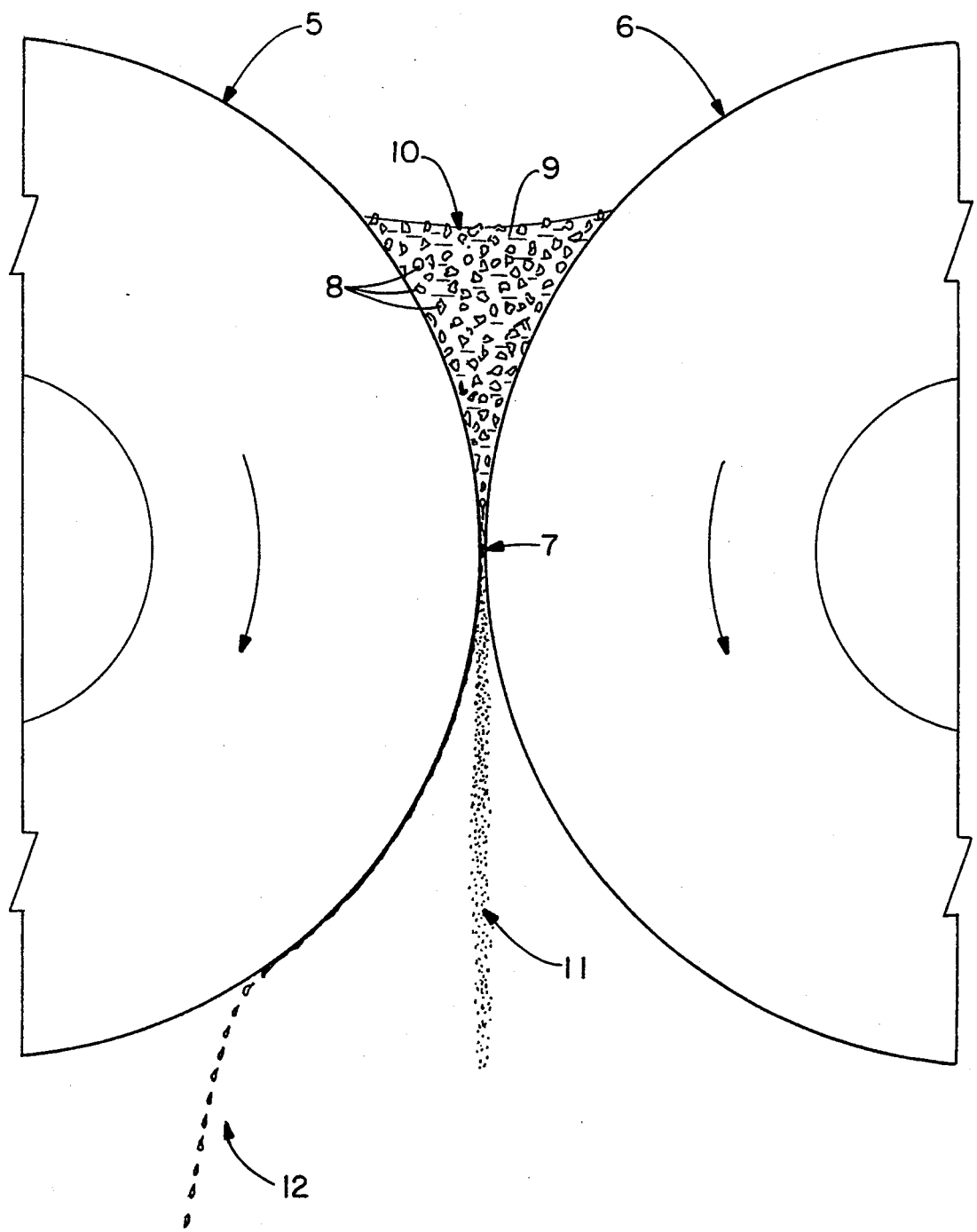

METHOD FOR TREATMENT OF SOLID MATERIALS

This application is a Continuation-In-Part of Applicant's U.S. applications Ser. No. 07/581,297 filed Sep. 12, 1990, now abandoned and Ser. No. 07/833,342 filed Oct. 2, 1992 now abandoned.

TECHNICAL FIELD

This invention relates to a method for treating solid materials such as commercial and municipal waste, or virgin rubber, resulting in a pulverized material including, but not limited to, metals such as fine stainless steel or filaments, plastics, rubber and glass. The method works effectively on pure and/or composite materials such as virgin materials like whole tires or tire sections, circuit boards, chips and other multi-component materials as well as grain, wood and paper scrap mixed with other solids or semi-solid material such as food scraps.

More particularly, the invention relates to a process by which waste materials are subjected to a compressive shear force in a zone resulting in pulverization and comminuting of the materials into individual particles rather than forming a sheet material. Smooth multiple parallel rolls, such as a two or twin roll mill is especially preferred to produce powdery material, viz. less than 30 mesh and preferably less than 40 mesh.

More specifically, this invention relates to a process by which waste materials treated with a liquid partitioning agent are subjected to a compressive shear force, resulting in pulverization/comminuting of the waste material into increasingly smaller particles of materials by continuous pulverization or particle size reduction through successive passes through the zone. This invention also prevents or inhibits the tendency for material to stick to the mill or related equipment.

This invention also offers a solution to a major problem in compounding rubbers with compounding agents experienced by the rubber industry and the tire manufacturer. Namely, the various virgin rubbers and/or reclaimed rubber are compounded with compounding agents in Banburys or on two roll mills to give sheets of masterbatch rubber. This masterbatching takes a relatively long time, about an hour to form the intimately mixed masterbatch, also, the curatives may be activated by the heat generated and they are sometimes added last to the cooled masterbatch. Anyway the industry has attempted to solve this problem by adding the compounding agents in solution or a latex form to the original rubber latex or rubber solution as the latex or solution is conjugated to give a crumb containing the rubber and compounding agents intimately mixed but the crumb contains large amounts of water that has to be removed by drying which frequently results in premature curing of the rubber. Also, the crumb has to be Banburyed as milled to sheets for tire building even though much effort has been devoted to building tires by rotational casting, it has not been accepted by the industry.

BACKGROUND

Municipal and industrial wastes normally include materials that vary widely in physical properties and characteristics. Some materials commonly encountered in such waste include paper and wood pieces, plastics, wire, such as stainless steel shavings or wire, glass, metallic containers, tires, tire fragments, chips, semiconductor material, printed circuit boards, plastic or rubber covered materials including electric covered wires, factory waste material and any waste disposed of by consumers for instance, meat scrap such as beef, pork, fish and vegetable scrap.

There are numerous examples of methods for treating waste. In U.S. Pat. No. 3,595,488 Blakley et al. describe a waste treatment system using a pulverization technique with a rotary cutting or chopping device similar to a hammermill that fractures materials.

U.S. Pat. No. 3,555,996 to Schwarz et al. describes an apparatus and method for reducing the volume of commercial waste by pulverization using a hammermill arrangement in which the device employs a number of hammer sites for reduction of the size of the waste.

Nopper et al. in U.S. Pat. No. 4,290,988 describes a method for recycling cellulose fibers for use in cellulose fiber composites. The waste cellulose fiber is subjected to a dry grinding technique, using a grinder known in the art, to affect the chopping of waste paper product into a fibrous form for construction of fiber composites.

Kunogi et al. in U.S. Pat. No. 3,995,819 describe an apparatus and technique for reclaiming thermosetting plastics by pulverization involving hammermill type construction in which the hammer blades are made of an alloy of nickel chromium for high strength to impart the necessary force to shatter thermosetting plastics into a useful powdered and atomized form.

In U.S. Pat. No. 3,726,483 Kometani et al. define the process for making ultrafine polytetrafluoroethylene powders by using high speed impaction of nearly spherical particles in a collision zone, caused by high velocity air injection of the powder in 180° opposed directions so that direct contact is made in the collision zone.

Brewer in U.S. Pat. No. 3,635,409 describes an integrated initiable waste system and method which uses wet and dry ball-mill grinding stages to reduce the particle size of floatable and non-floatable waste materials. The grinding is done in a ball-mill which is a modified type of hammering procedure.

In U.S. Pat. No. 4,607,796 Enikolopov et al. describe a process for pulverization of rubber and vulcanized rubber products using an extruder. In this invention the rubber material is subjected to a hot zone and then a cold zone and high compressive force is combined with the temperature differential which affects pulverization of the substance to form powdered material.

All of the above patents use either hammering to reduce the size of waste materials or thermally graded extruders with high shear force and compressive force to shatter the material into small parts because two roll milling is not effect to reduce the particle size to the mesh size designation and the energy cost for milling the excessive cycles or passes is prohibitive.

Due to the tendency of mill processes to agglomerate the particles to give larger masses and eventual sheets, as shown by the above cited patents, or the inability of milling to produce powders of less than 30 mesh economically, in recent years the practice of cryogenic processing with liquid nitrogen, etc. to give very fine particles has attracted a lot of attention unfortunately cryogenic processes are relatively costly and hazardous.

It is desirable to have a simplified and more efficient method for reducing the size of industrial and municipal waste independent of the composition of the waste. Also, powdered virgin rubber offer advantages in compounding rubber with compounding agents. This may be accomplished by subjecting the waste or virgin rubber to shear force in a compressive zone between two members, where at least one member is moveable and the material is prevented from sticking to the members by the lubricant or wetting agent and exits the zone essentially as a powder dry to the feel of the hands. The powders of this invention are dry and thus does not require drying, also, the fine particles of this invention can be compounded with finely divided compounded agents to give relatively economical produced masterbatches.

SUMMARY OF THE INVENTION

It is an aspect of the present invention to provide a method for comminuting and/or pulverizing solid materials such as industrial or municipal waste and also virgin rubbers comprising the steps of forming a zone between two members with at least one member being moveable; moving said material into and through said zone, said material being treated with a liquid partitioning, wetting, anti-agglomeration or anti-mastication agent or mixture thereof while in said zone; subjecting said material to a compressive shear as said material passes into and through said zone to block sheeting and cause the sheet to disintegrate; and the amount of the essentially liquid to liquid agent is present in amounts to prevent sticking agglomeration to produce essentially a powder dry to the feel after a minimum of passes through the zone, such as generally about 2 to 30 passes through the zone rather than being an agglomerate in crumb or sheet form.

It is a further aspect of this invention to apply the process repetitively, but as few times as possible, until a given particle size is obtained. The number of repetitive sequences of the process of the present invention to reduce a stream of solids to a given particle size is dependent on the composition, the compressive shear and the size of the particles desired.

A further aspect of this invention is to describe a fully integrated waste management and treatment facility for the treatment, pulverization, separation and recovery of desirable end products from commercial and municipal waste or material streams, incorporating the pulverization process described more fully herein.

Another aspect of their invention is to furnish a method of producing fine particles, usually less than about an eighth inch to less than 30 mesh and preferably less than 40 mesh. Virgin rubber and/or reclaimed rubber capable of being compounded with finely divided solid or solutions (latex) of the normal compounding agent to produce very economical masterbatches useable to produce tires, hoses, belts and related industrial goods.

The process of the present invention comprises the steps of: 1) forming a zone between two members at least one of which is moveable; 2) moving the solid material into said zone, the material containing a partitioning, wetting or anti-mastication agent, or mixture thereof, preferably as a liquid, prior to the material entering the zone; and 3) subjecting the material to a compressive shear as the material passes into and through said zone sufficient to cause the fine to powdery material to exit dry to the feel without agglomerating together say as a sheet or crumb.

The partitioning, wetting or anti-masticating agent or mixture thereof, preferably as a liquid, is added to prevent the material from adhering to itself and to a surface of said members. The above process can be repeated any number of times until a desired particle size and distribution is obtained.

The process of the present invention requires a compressive shear to be applied to the material as the material enters and passes through the zone. As the particle size of the material reduces, it should be recognized by one of ordinary skill in the art, that the equipment used in the process may require adjustment in order to maintain a given compressive shear or the feed rate or both to effect a further reduction in particle size of the material entering the zone and passing through the zone.

This process can more easily be understood by considering the illustrative and representative reduction of passenger tires to small particle size remnants of the tire. First, a whole tire is passed through a zone that would apply enough compressive shear to cause preliminary destruction of the toroidal shape of the tire by causing a split between the seams where the plies and belts are spliced. This process would cause unravelling of the basic toroidal shape of the tire. The zone can be thought of as essentially equal to the gap between the two members. The distance between the two members must be sufficiently large that the tire will not stall the equipment (viz., a twin roll mill) but sufficiently small so that sufficient compression and shear exists to cause destructive comminution of the whole tire.

As the tire begins to be reduced in particle size, the distance between the two members must be reduced, depending on the equipment, to maintain a compressive shear force on the material as it comes into and passes through the zone.

Successive application of the process may involve changes in equipment setting to maintain an adequate compressive shear force across the zone or increase the feed rate to cause the feed to back up in a bank. As the particle size becomes progressively smaller, the process can be modified to change the physical form and characteristics of the final comminuted material. This modification involves the addition of more partitioning agent, the adjustment of the equipment so as to maintain or increase the compressive shear and a concurrent increase in the volume of material being fed into and through the zone. This modification utilizes internal particle-particle interaction in a non-adhering environment to further reduce and physically change the form and shape of the particles. Also, it is amazing that although the material is reduced to individual particles, these particles can be produced without the rolls being more than slightly warm to the hand.

The process of the present invention prefers a liquid partitioning, wetting or anti-mastication agent. Any type of liquid can be used which will act to disrupt interparticle adherence or particle-equipment and surface adhesion by acting to prevent agglomeration of the particles. The agents that are useful in this process include but are not limited to: water, water containing other components such as soaps, surfactants including cationic, anionic and non-anionic, additives to improve wetting and/or viscosity modifiers, which change the characteristics of water while maintaining a relatively low cost. They include alcohols, organic solvents, or any other type of liquid agent that would reduce or eliminate intermaterial adhesion and/or material-equipment adhesion. The main requirement or property that these agents must have is that they must be incompatible, or sufficiently incompatible to effectively interfere with interparticle adhesion and particle-equipment surface adhesion.

The preferred agent for this process is water containing an ingredient to improve the wettability of water. The exact nature of the ingredient will depend on the nature of the material to be comminuted, i.e., the ingredient is compositionally dependent. That is, the type of ingredient to be added to water will vary depending on the material being pulverized. In the case of rubber or plastic materials, soaps or other surfactants that improve the water wettability are preferred. These include, but are not restricted to, metal fatty acid salt, soaps, polymeric salts, anionic surfactants, ammonium salts, polyvinyl alcohol, polyvinyl acetate, ionomers, miscellaneous foaming surfactants and the like. As was mentioned above, besides surfactants, any other type of component that increases the wettability of water onto different types of surfaces that are not necessarily hydrophilic can be used, such as polyvinyl alcohols, polyvinyl acetates or other polymeric wetting agents commonly used in water to increase its wettability on surfaces that are hydrophobic or non-hydrophilic.

However, in other applications, the ingredient may be substantially different in character. A water-based agent may not be the preferred agent for all materials. Reduction, pulverization and comminution of inorganic or mixed organic/inorganic compositions such as computer chips, may use organic agents such as medium molecular weight alcohols, liquid polymers or the like. Although the major feature of this process is the use of a liquid agent which interfaces with particle to particle adhesion, the process can be practiced with the addition of a solid grinding agent. Such solid grinding agents include but are not limited to carbon black, silica, carborundum, diamond, sapphire, alumina, sand or the like.

It has been observed that with some solid polymeric materials some surfactants give fine to powdery particles that readily pick up electrostatic charges and clump together and are more difficult to screen the finer sizes. Therefore, it has been discovered that the type of surfactant used exhibits different properties in the fines relative to charge build up. For instance a standard metal soup surfactant yields fine powders of the LLDPE polymers that clump together on a 40 mesh screen and require rubbing with the hand to cause all the fines to pass the screen. On the other hand use of anionic or non-ionic surfactant the fines have charges of smaller or a different polarity and can be caused to pass the screen more easily. Also, the screened particles that pass a 40 mesh screen may still be susceptible to charge building.

The method of the present invention can utilize any type of equipment that can produce a compressive shear zone with at least one member in the equipment being moveable. The term "compressive shear zone" is meant to indicate a zone which subjects material to compression and shear simultaneously. The type of equipment useful in the present invention includes mills, extruders, grinders or any other type of equipment where a compressive shear zone is produced between two members, at least one of which is moveable but does not hammer or cut the solid.

The preferred apparatus for the present invention are twin roll mills in which the mills move at the same or different rates, preferably at different rates, with generally, the front roll moving at a lower speed than the back roll, thus producing a compressive shear force across any material entering and passing through the zone defined essentially by the region of the gap between the two rolls. The gap is usually about the same thickness as the solid to the smaller. The compressive shear force is greater when the rolls move at a different speed, rather than moving at the same speed. As stated above, as the material entering the twin roll mill decreases in particle size, the gap between the two rolls may be decreased accordingly to maintain a compressive shear force across the zone as the material enters and passes through the zone for further reduction. Also, the feed rate can be increased to maintain the shear force.

The roll surfaces of the twin roll mill preferably are non-fluted to smooth.

As mentioned above, a modification in the process of the present invention will allow particle form, shape and size to be altered by the addition of more partitioning agent with a corresponding increase in the amount of material being fed to the zone.

The addition of the partitioning, wetting, or anti-masticating agent to the material can either be done prior to entering the zone or at the entry point. This can be accomplished by any application mechanism known in the art. This includes, but is not limited to, swabbing, dousing, soaking, spraying or any other technique for adding the agent to the material. Specifically, the wetting agent is used in at least sufficient quantity to prevent sheeting on the roll and begin to break up in smaller pieces.

The process of the present invention can be used to reduce the particle size of any type of composite material or pure material that enters the zone provided the material has present a partitioning, wetting, or anti-masticating agent, or a combination thereof. This includes tires, printed circuit boards, polymer coated wire, semiconductors, computer chips, metal and semi-conductor components, compositions that include metals, plastics, paper, wood products, grain products, or other materials, metal, wood, plastic or any other pure or composite materials or mixtures thereof.

The process ultimately causes the pulverization of the composites into smaller and smaller particles. As the particle size is reduced, the material that makes up each particle becomes more and more of one particular type, thereby affecting a separation of the composite into its discreet components. Thus, a waste stream composed of polymer coated electrical wire, for example, can be separated into the metal and polymer components by successively reducing the particle size of the material. As the particle size is reduced, the dissimilar materials are separated into small particles of each independent composition. Thus, a polymer coated copper wire would end up as small copper particles and small plastic particles. Uniquely the copper particles have a plate fracture.

This combined particulate matter could then be subjected to standard separation techniques which will separate, according to density or some other differential property, for a given particle size distribution. The separation process can include, but is not restricted to, cyclone separators, water separators, magnetic separators or any other type of separator that separates according to density, magnetic properties or any other compositionally intact, mechanical, physical, electrical, chemical or physical/chemical properties.

The same technique works for tires that include components made of rubber, metal, and fabric, as well as numerous other components. As the tire is successively reduced in particle size, the particles becomes more and more pure, ultimately resulting in a particle mixture which includes particles of metal such as brass coated steel (which is typically used as a component in tire applications), filled vulcanized elastomer where the filler may be carbon black, silica, or other filler or mixture thereof, and fabrics such as polyester, rayon, Kevlar ® or other similar fabrics. Rubber is understood to mean any filled, unfilled, vulcanized or cured or virgin elastomer or mixture of elastomers.

Once the particle size has been reduced sufficiently so that the particles are nearly completely of a given compositional makeup, the separation techniques as stated above can be used to separate the tire components. Thus, the steel particles can be removed by gravity, cyclone or magnetic separators, while the other components will ultimately end up in a gradation of materials according to the separation technique used.

This same technique can be used for any other type of composite material including semi-conductor chips which include metals, plastic and semi-conductor material where, as the particle size is reduced, the material becomes more and more compositionally pure. Therefore, the chips can ultimately be separated into a relatively if not essentially pure forms of semi-conductor, plastic used to mount the semi-conductor and metals used to act as the conducting elements in the chip.

The same technique is applicable to articles such as printed circuit boards, making the recovery of the conducting material from the fibrous material used for making up the printed circuit boards, or for any other type of complex composite material, possible and easy.

The same technique ultimately is useful for pulverization of pure forms of plastics to allow for more efficient and easier storage and reuse of the plastic materials, especially items such as polyester bottles which could be reduced to a powdered form to be reused in the injection molding process that made the bottles originally.

Because of the nature of the process, subjecting pure forms of plastic to this process gives rise to unique particulate forms of the material as it is successively reduced in size. Compositions such as polyethylene or polypropylene become very flat, small particles that are non-spherical and that appear to be very small saucers or flakes, where the dimension in two directions is much greater than the dimension in the third direction, i.e., they come out as flat discs or flakes. This form of the particulate matter is of great potential utility as an absorbent for chemical spills such as oil, or for other types of organic material that :may be spilled into a waterway, including the ocean. Thus, it can be envisioned that this type of flattened particulate polymer can be used in the containment and cleanup of oil or chemical spills. The unique shape of the particles, as they are reduced in the process of this invention, gives the particles more buoyancy than their density would suggest, allowing them to cover a larger space and give more surface area for wetting and contacting the components that are being absorbed.

Municipal wastes, which can include organic material and combinations of paper, plastic and metals can also be subjected to this process, to result in a comminuted and pulverized composition, which includes particles of each species that went into the waste material that entered the shear zone. Once this material has been sufficiently reduced to essentially pure particles of one form or another, any type of separator can be used to separate the materials into different types of components. Thus, all metals could be recovered as a high density cut or fraction, using a density separator. Medium and low density materials could also be recovered for potential reuse. The organic material could be used for fertilizer in a compact form and the lighter material, which would typically include plastics and other types of synthetic organic compositions. It could also be utilized in bulk form to be reconstituted and reformatted into usable material such as benches or other building material where the exact nature of the composite is not critical to the structural integrity desired.

BRIEF DESCRIPTION OF THE DRAWING

FIG. 1 shows a partial schematic view of a preferred embodiment of the invention.

BEST MODE

Applicant has found that by passing a material of any composition through a twin roll mill, where the material has been lubricated either before or at the point of entry, into the compressive shear zone defined between the two surfaces of the rolls of the twin roll mill, the particle size of the material that enters the zone may be reduced in size rather than being sheeted out. Applicant has found this process to be generally applicable to any type of materials. By successive application, the material can be reduced to any desired particle size distribution that is necessary or required for a given application for the material and with fewer passes than required in conventional practice.

The technique has been shown to be ideally suited for the pulverization and comminuting of whole tire or tire segments to render a powdered form that can be separated into various components including vulcanized rubber, fabric particles such as Kevlar ®, polyester or rayon and metals that come from the belts or the bead composites that are typically used in all passenger, truck and large off-the-road vehicle tires.

The applicant has also found that this method is of general use in the reduction in particle size of any type of commercial or municipal material for instance waste such as garbage and of any mixed component to a form where the material can potentially be separated into the various materials that made up the original feed or result in 8 mixtures be used as land fill, for example.

Applicant has found that the principal necessity for accomplishing the reduction in particle size is to insure that the material, as it enters the zone between the two rolls of a twin roll mill or any type of equipment such as an extruder or any other equipment that has at least one moving surface and creates a compressive shear zone, contains sufficient partitioning agent viz., water plus a surfactant so that interparticle or particle-equipment adhesion does not occur to cause generation of excess heat and agglomeration. In fact, the excess heat generation is reduced and most times the rolls are hardly hot to the hand.

Applicant has found that the partitioning agent need not be applied at every successive reintroduction of the material into the zone to affect a further reduction of particle size. Typically, it has been found that only one application of the partitioning agent is necessary to accomplish a reduction in particle size by this method repeated applications are preferred.

Applicant has found that from about 0.5% to about 20% by weight of partitioning agent on solid material basis is generally sufficient to effectively interfere with particle adhesion; with from about 1–15% being preferred and from about 1–5% being particularly preferred. However, in certain applications, more than 20% partitioning agent may be required or desired, depending on the partitioning agent being used and the material being reduced in size. In fact, a flooded operation can be used provided the material exits the gap has a dry feel.

Applicant has also found that water or water containing a surfactant, wetting agent or the like are particularly preferred partitioning agents. When a water containing surfactant or the like is used, the amount of surfactant is from about 1% to about 20% by volume of water when the surfactant is a liquid and from about 1% to about 20% by weight when the surfactant is a solid, preferably from about 2% to about 15% by weight or volume of water and especially from about 2% to about 10% by weight or volume of water.

For waste material such as tires, hoses, belts, chips, circuit boards and the like, which contain metallic components, the preferred equipment for affecting the process of this invention is twin roll mills. Successive reduction can easily be accomplished by the use of a mill train with each mill in the train connected by conveyor means such as conveyor belts, and each mill having a successively smaller gap. As the particle size decreases, the gap can be increased with a concurrent increase in feed volume to affect further size reduction and particle shape augmentation.

The objects and aspects of this invention are further described by the following illustrative examples. The following abbreviations will be systematically used in the examples:
 g-grams
 mL-milli Liters
 cc-cubic centimeters (used interchangeably with mL)

EXAMPLE 1

General Procedures

This example illustrates the general procedure for particle size reduction using the process of the present invention. The exact material to be reduced or comminuted can be any one of an endless variety of commercial or municipal waste or virgin solid materials. In this general outline, three eighths of an inch to one fourth of an inch rubber chips were used with the gap being 0.01 to 0.1 of an inch or more. 1,000 g of rubber chips were passed through an eight inch (8") twin roll mill having smooth roll surfaces to flatten the chips. This preliminary flattening step is not necessary and was performed as a matter of convenience. The gap in the mill (the gap between the two rolls) was tight, meaning that the gap is adjusted to be as close together as standard operation will allow. 200 mL of water containing 2 volume percent of synthrapol, a wetting agent, was added to the flattened rubber chips and passed through the mill. This latter step can be repeated any number of times until a desired particle size distribution is obtained.

EXAMPLE 2

This example illustrates the particle size reduction of rubber chips using an anti-masticating agent and a grinding agent in combination. 1,000 g of rubber chips and 100 g of carbon black were passed through an eight inch (8") twin roll mill having smooth roll surfaces to flatten the chips. This preliminary flattening step is not necessary and was performed as a matter of convenience. The gap in the mill (the gap between the two rolls) was tight, meaning that the gap is adjusted to be as close together as standard operation will allow.

Pass #1: 200 mL of a 2 volume percent of synthrapol ™ anti-masticating aqueous solution was added to the flattened rubber chips and passed through the mill.

Pass #2: the material from pass #1 was passed through the mill.

Pass #3: an additional 100 mL of the anti-masticating solution was added to the material of pass #2 and fed through the mill.

Pass #4: an additional 150 mL of the anti-masticating solution was added to the material of pass #3 and re-introduced to the mill.

Pass #5: 150 mL of the anti-masticating solution was added to the material from pass #4 and re-introduced to the mill.

Pass #6: the material from pass #5 was re-introduced to the mill.

Pass #7: 100 mL of the anti-masticating solution was added to the material from pass #6 and re-introduced to the mill.

The rubber was warmed during the process and much of the water evaporated during processing so that the final comminuted product does not feel wet to the touch.

The final particle distribution was as given below where the numbers represent standard mesh units:

| Mesh | Percentage |
| --- | --- |
| +10 | 0% |
| +50 | 22% |
| +100 | 22% |
| +200 | 15% |
| +325 | 5% |
| −325 | 36% | where the plus sign (+) indicates that the particles did not pass through a screen of the designated size and the minus sign (−) indicates that the particles did pass through a screen of the designated size. Thus, in seven passes through the mill 36% of the output was less than 325 mesh with 78% of the overall particle size being less than 50 mesh.

EXAMPLE 3

This example illustrates the particle size reduction of rubber chips using an anti-masticating or anti-agglomeration, aqueous solution containing ingredient for improving water wettability and a dry grinding agent in combination. This example also illustrates the necessity of having the anti-masticating agent present.

Pass #1: 1,000 g of rubber chips were passed through an eight inch (8") twin roll mill having smooth roll surfaces to flatten the chips. This preliminary flattening step is not necessary and was performed as a matter of convenience. The gap in the mill (the gap between the two rolls) was tight, meaning that the gap is adjusted to be as close together as standard operation will allow.

Pass #2: the flattened rubber chips were passed through the mill.

Pass #3: the material from pass #2 was passed through the mill and the following particle size distribution was obtained:

| Mesh | Percentage |
|---|---|
| +10 | 92% |
| +50 | 6% |
| +100 | 2% |
| +200 | 0% |
| +325 | 0% |
| −325 | 0% |

Pass #4: the material of pass #3 was fed through the mill and the following particle size distribution was obtained:

| Mesh | Percentage |
|---|---|
| +10 | 42% |
| +50 | 54% |
| +100 | 3% |
| +200 | 1% |
| +325 | 0% |
| −325 | 0% |

Pass #5: the material of pass #4 was fed through the mill and the following particle size distribution was obtained:

| Mesh | Percentage |
|---|---|
| +10 | 13% |
| +50 | 77% |
| +100 | 6% |
| +200 | 4% |
| +325 | 0% |
| −325 | 0% |

Pass #6: 60 mL of water and 20 mL of Perform TM, an anti-masticating agent, were added to the material of pass #5 and re-introduced to the mill. The following particle size distribution was obtained:

| Mesh | Percentage |
|---|---|
| +10 | 2% |
| +50 | 64% |
| +100 | 30% |
| +200 | 4% |
| +325 | 0% |
| −325 | 0% |

Pass #7: the material of pass #6 was fed through the mill and the following particle size distribution was obtained:

| Mesh | Percentage |
|---|---|
| +10 | 1% |
| +50 | 84% |
| +100 | 14% |
| +200 | 1% |
| +325 | 0% |
| −325 | 0% |

Pass #8: the material of pass #7 was fed through the mill, the gap in the mill was increased and the following particle size distribution was obtained:

| Mesh | Percentage |
|---|---|
| +10 | 25% |
| +50 | 67% |
| +100 | 8% |
| +200 | 0% |
| +325 | 0% |
| −325 | 0% |

Pass #9: 100 mL of water and 30 mL of Perform TM, an anti-masticating agent, were added to the material from pass #8 and re-introduced to a tight (smallest gap) mill. The following particle size distribution was obtained:

| Mesh | Percentage |
|---|---|
| +10 | 0% |
| +50 | 32% |
| +100 | 32% |
| +200 | 30% |
| +325 | 6% |
| −325 | 0% |

Pass #10: the material of pass #9 was fed through the mill, the gap in the mill was increased and the following particle size distribution was obtained:

| Mesh | Percentage |
|---|---|
| +10 | 0% |
| +50 | 20% |
| +100 | 47% |
| +200 | 30% |
| +325 | 3% |
| −325 | 0% |

Pass #11: 100 mL of water was added to the material from pass #10 and re-introduced to a tight mill. The following particle size distribution was obtained:

| Mesh | Percentage |
|---|---|
| +10 | 0% |
| +50 | 20% |
| +100 | 45% |
| +200 | 35% |
| +325 | 0% |
| −325 | 0% |

Pass #12: the material of pass #11 was fed through the mill and the following particle size distribution was obtained:

| Mesh | Percentage |
|---|---|
| +10 | 0% |
| +50 | 17% |
| +100 | 55% |
| +200 | 28% |
| +325 | 0% |
| −325 | 0% |

Pass #13: 200 mL of water and 100 g of carbon black were added to the material from pass #10 and re-introduced to a tight mill.

Passes #14–16: the material from the last pass was passed back through a tight mill and the following distribution was obtained:

| Mesh | Percentage |
| --- | --- |
| +10 | 0% |
| +50 | 8% |
| +100 | 20% |
| +200 | 17% |
| +325 | 10% |
| −325 | 45% | where the plus sign (+) indicates that the particles did not pass through a screen of the designated size and the minus sign (−) indicates that the particles did pass through a screen of the designated size.

The rubber was warmed during the process and much of the water evaporated during processing so that the final comminuted product does not feel wet to the touch. Comparing the particle distribution of pass #5 and pass #6, one can immediately see the consequence of the addition of an anti-masticating agent. Also, comparing pass #6 to pass #7, one can see that remove of the anti-masticating agent or anti-agglomerating agent cause the particle size to increase, which is indicative of standard mill behavior of rubber.

There are numerous other comparisons which can be made between passes, which include the anti-masticating or anti-agglomeration, but they all show that agglomeration occurs in the absence of the anti-agglomeration agent and deagglomeration occurs in the presence of the anti-agglomeration agent. The passes also show the effect of opening and closing the gap in the mill. Opening the gap affects the particle size distribution as can be seen comparing passes 7 and 8 and passes 9 and 10.

EXAMPLE 4

This example illustrates the particle size reduction procedure described in Example 1 applied to the following materials:

| | |
| --- | --- |
| virgin rubber or plastic | |
| whole tires | whole tire segments |
| tire tread | fan belts |
| drive belts | conveyor belts |
| rubber hose | high pressure rubber hose foam |
| rubber | EPDM rubber |
| rubber gaskets | scrap extrusion rubber carpet |
| padding | carpet and backing |
| cork gasket | polyurethane |
| Elvicite Acrylic Resin | polyether ether ketone |
| nylon | teflon |
| gor-tex ® | polyphenylene ether |
| ABS | polyvinylchloride |
| high impact polystyrene | automotive resin |
| Siltem TM | polyethylene |
| polyimide (Kapton TM) | electronic components |
| circuit boards | computer chips |
| newsprint and magazines | wood and wood chips |
| plant fiber | rope |
| leaves | leather |
| plastic film and bags | plastic containers |
| plastic oil containers | foil food containers |
| aluminum cans | tin cans |
| disposable diapers | coated copper wire |
| coated aluminum wire | cardboard |
| rags | food |
| glass | grain |
| used rugs | |
| a combination of tire rubber and polyphenylene ether | |
| a combination of tire rubber and polyurethane | |
| a combination of tire rubber and Siltem TM | |
| a combination of tire rubber and automotive resin | |
| a combination of tire rubber and high impact polystyrene | |
| a combination of tire rubber and cellulose | |
| a combination of tire rubber and ethyl cellulose | |
| a combination of tire rubber and ABS | |
| a combination of tire rubber and elvicite acrylic resin | |
| a combination of tire rubber and nylon | |
| a combination of tire rubber and polypropylene | |
| a combination of tire rubber and polyethylene | |
| a combination of tire rubber, fly ash and lime | |

All of the prior materials can be reduced to any desired particle size by following a comminuting sequence similar to Example 2. However, it should be recognized that the exact final particle size distribution after a number of passes will depend on the composition of the feed.

EXAMPLE 5

Polyamide resin and particularly Kapton is relatively expensive and it is very desirable to reclaim its scrap as a powder for reuse.

Kapton scrap from various manufacturing operations was fed to a mill like that of FIG. 1 with the rolls adjusted to essentially in contact to 0.5 mm and preferably 0.25 to 1 mm or somewhat greater depending on the size of the scrap to be comminuted. About 1 to 8% of water was fed to the mill with more scrap than immediately pass through the nip or gap of the rolls and accumulated as a bank 10. On two passes through the mill it was essentially all fine particles and by 10 passes it was a powder.

EXAMPLE 6

When chopped particles of a clay and carbon black loaded rubber mat approximately 0.25 to 0.5 inches was used on the mill of FIG. 1. The rolls 5 and 6 are rotated downward with the gap 7 being formed by moving the rolls together to give the gap a distance of about 0.05 mm or larger. With the rolls rotating, a chopped mat 8 with excess water 9 is fed into the nip of the rolls and at a rate to give a bank 10. Or about 20 passes through the rolls, the chopped mat dropped out as a fine powder 11 having a dry feel to the hand. Any excess water passing through the gap tended to follow the roll around and the excess water drops off as a stream 12 as shown in the drawing.

EXAMPLE 7

The mixture fed to the mill in this example was composed of about 25 to 50% by weight of meat scrap, a mixture of bony beef, fish and pork parts, about 2 to 10% cellulosic material such as packaging boxes, wood chips or sawdust, about 10 to 30% vegetable matter such as bread, grasses, leaves, fruit scrap was charged to the mill with about 2–8 and preferably 2–5% lime and sufficient water to wet the surface.

A dry powdered product continuing 9% of moisture exhibited a unique property of not exhibiting considerable odor of decay. This product with its relatively high nitrogen content and lime content would be an excellent filler for concentrated chemical fertilizer or as a form of powdered soil treating agent for flower or garden plots.

EXAMPLE 8

Filamentary stainless steel wire is available in sufficient quantities to create problems of disposal. Pieces of this scrap were charged to the mill using flooding with water with the rolls adjusted to essentially in contact. After a number of passes through the mill, the resulting powder was dry to feel and on examination under a microscope the powder showered the diameter of the filament had been burst open. The breaking of the filament along its diameter provides a powder that could be used instead of asbestos in brake linings as it has some properties of asbestos.

The process of this invention can be operated at a temperature of about 25° F. to about 150° F. but it is preferred to operate at about 30° F. to 80° F. Use of a coolant inside the rolls may be used to advantage to obtain the optimum operation temperature of about 40° to 75° F.

EXAMPLE 9

A virgin rubber, viz., natural, B.D. polybutadiene, cis rubber, polyisoprene, EPDM rubber may be taken from the bale and may be fed to a twin roll mill and converted to particulate rubber of less than 40 mesh with water, preferably containing about 1 to 5% surfactant with between about 8 to 20 passes through the mill. This particulate virgin rubber may be compounded by mixing with the usual compounding ingredients, such as sulfur, curatives and accelerates antioxidant, antiozonants, fillers such as silica and/or carbon black and the like. This mixing may be achieved on a ball mill, stirring and tumbling or other well-known mixing methods without resort to Banburing or milling. Consequently, the rubber masterbatch is achieved with a great saving in energy relative to the customary practice of compounding the materials in a Banbury mill or twin roll mills. Also, this powdery masterbatch can be moved to its place of use and is free of the tendency to stick together. This method affords a method of producing economically a powdery rubber masterbatch that has been a goal of the rubber industry for years to produce cured shaped articles.

While in accordance with the patent statutes, the best mode and preferred embodiment of the invention have been described, it is to be understood that the invention is not limited thereto, but rather is to be measured by the scope and spirit of the appended claims.

What is claimed is:

1. A process for comminuting/pulverizing material to produce fine to powdery particles selected from the class consisting of commercial and municipal solids comprising the steps of:
   forming a zone between two members with at least one member being moveable;
   moving said material into and through said zone, said material having a partitioning agent thereon; and
   subjecting said material to a compressive shear as said material passes into and through said zone to produce a fine to powdery material.

2. A process according to claim 1 wherein said process is repeated until a given particle size of less than 40 mesh is achieved.

3. A process according to claim 1 wherein said material is used tires.

4. A process according to claim 1 wherein said partitioning agent is selected from class consisting of water (or) and water containing a surfactant.

5. A process according to claim 4 wherein said water has from about 1% to about 20% of a surfactant.

6. A process according to claim 5 wherein said surfactant is selected from the group consisting of metal fatty acid salt, soaps, polymeric salts, anionic surfactants, ammonium salts, polyvinyl alcohol, polyvinyl acetate, ionomers, miscellaneous foaming surfactants and the like.

7. A process according to claim 1, wherein said process is repeated until a given particle size of less than 40 mesh is achieved.

8. A process according to claim 1, wherein said waste material is a vulcanized filled or unfilled elastomer.

9. A process according to claim 1 wherein said partitioning agent is selected from the class consisting of water and water containing a surfactant.

10. A process according to claim 9, wherein said water has from about 1% to about 20% of said surfactant.

11. A process according to claim 9, wherein said surfactant is selected from the group consisting of metal fatty acid salt, soaps, polymeric salts, anionic surfactants, ammonium salts, polyvinyl alcohol, polyvinyl acetate, ionomers, miscellaneous foaming surfactants and the like.

12. A process for comminuting/pulverizing solid material or materials comprising the steps of:
   (a) forming a zone between two rolls of a twin roll mill where one roll moves at the same or different rate from the other roll;
   (b) moving said material into and through said zone, said material having a partitioning agent thereon; and
   (c) subjecting said material to a compressive shear as said material passes into and through said zone;
   (d) repeating step a-c until a given particle size is achieved; and
   (e) subjecting each of particles to a separation means whereby each of particles are separated into distinct materials to exit dry to feel.

13. A process according to claim 12, wherein said separation means is a cyclone separator.

14. A process according to claim 12, wherein said separation means is a magnetic separator.

15. A process according to claim 12, wherein said particles are fed to a screen separator.

16. A method of milling semi-solid to solid material to reduce tendency of particles formed agglomerating and sheeting together to give a mill greater efficiency for producing fine to powdery particles comprising forming a zone between two rolls of said mill to form a gap having dimension from thicker than said material to essential that when said rolls are in contact with each other, feeding said material through said gap at a rate to maintain compression shear on said material to form smaller particles and contacting said feed material with sufficient partitioning agent to suppress tendency of said particles to agglomerate together in larger masses during each pass through said gap and exit said gap to give said particle a dry feel.

17. A method of producing a rubber masterbatch comprising passing rubber through a zone formed by two members with at least one being movable, supplying said rubber with a partitioning agent selected from the class consisting of water and water containing a surfactant to the zone, applying compressive shear in the zone to the rubber to whereby the rubber stops sheeting in the zone and disintegrates to form particles of about 50 mesh or less within about 10 to 30 passes through said zone to yield a rubber having particles of 50 mesh or less, compounding said rubber having particles of 50 mesh or less with compounding agents having a particle size of 50 mesh or less by stirring them together to yield a flowable powdery masterbatch and charging said masterbatch to a shaper and curing to give a cured article.

* * * * *